(12) United States Patent
Dallas et al.

(10) Patent No.: US 8,776,910 B1
(45) Date of Patent: Jul. 15, 2014

(54) CLUTCH FOR ELECTRIC POLE SAW

(71) Applicant: Blount, Inc., Portland, OR (US)

(72) Inventors: Edgar A. Dallas, Beaverton, OR (US); Evan Pickett, Tigard, OR (US)

(73) Assignee: Blount, Inc., Portland, OR (US)

( * ) Notice: Subject to any disclaimer, the term of this patent is extended or adjusted under 35 U.S.C. 154(b) by 0 days.

(21) Appl. No.: 14/186,875

(22) Filed: Feb. 21, 2014

(51) Int. Cl.
- *F16D 3/02* (2006.01)
- *F16D 43/20* (2006.01)
- *B25B 23/14* (2006.01)

(52) U.S. Cl.
CPC .............. *F16D 3/02* (2013.01); *B25B 23/141* (2013.01); *F16D 43/20* (2013.01)
USPC ................ 173/1; 173/47; 173/217; 173/146; 173/178; 30/392; 192/54.1; 192/56.2; 81/467; 81/472

(58) Field of Classification Search
CPC ......... F16D 43/20; F16F 43/18; B25B 23/141
USPC .......... 173/1, 47, 217, 146, 178; 81/467, 472; 192/54.1, 56.2; 30/392
See application file for complete search history.

(56) References Cited

U.S. PATENT DOCUMENTS

| 1,954,620 A | * | 4/1934 | Connell | 192/56.2 |
| 2,692,665 A | * | 10/1954 | Pepper | 192/41 R |
| 7,913,403 B1 | * | 3/2011 | Willetts | 30/392 |
| 8,113,328 B2 | * | 2/2012 | Harrison et al. | 192/69.9 |

* cited by examiner

*Primary Examiner* — Michelle Lopez
(74) *Attorney, Agent, or Firm* — Schwabe Williamson & Wyatt

(57) ABSTRACT

Embodiments of clutches for electric pole saws, and related methods, are disclosed herein. An electric pole saw may include an electric motor, a drive shaft coupled between the electric motor and a cutting instrument, and a clutch coupled between the electric motor and the drive shaft. The clutch may include a motor portion having an exterior surface, a drive shaft portion having an exterior surface and forming a mated assembly when mated with the motor portion, and a spring around the motor and drive shaft portions. The spring may exert a holding force on the mated assembly, such that rotation of the motor portion in a first direction loosens the spring and reduces the friction holding force until a torque between the motor and drive shaft portions exceeds the holding force, causing rotation of the motor portion to be decoupled from rotation of the drive shaft portion.

17 Claims, 7 Drawing Sheets

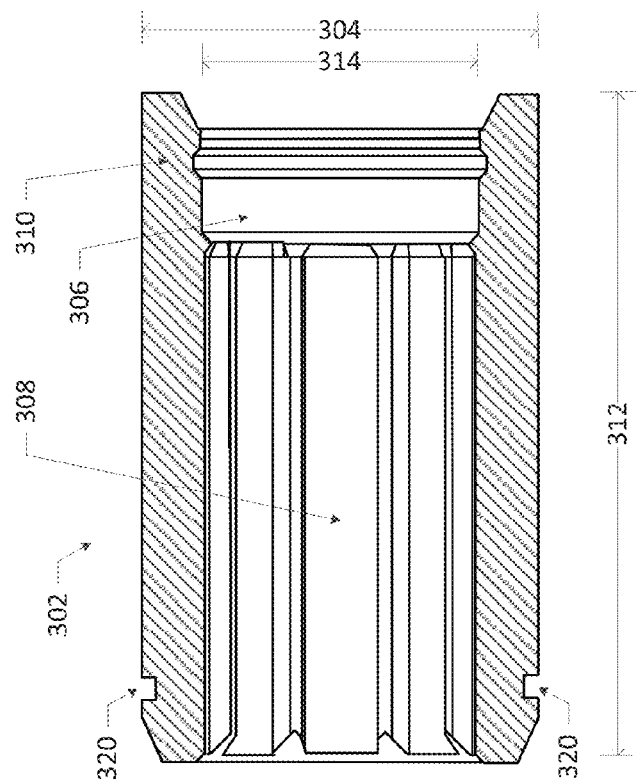
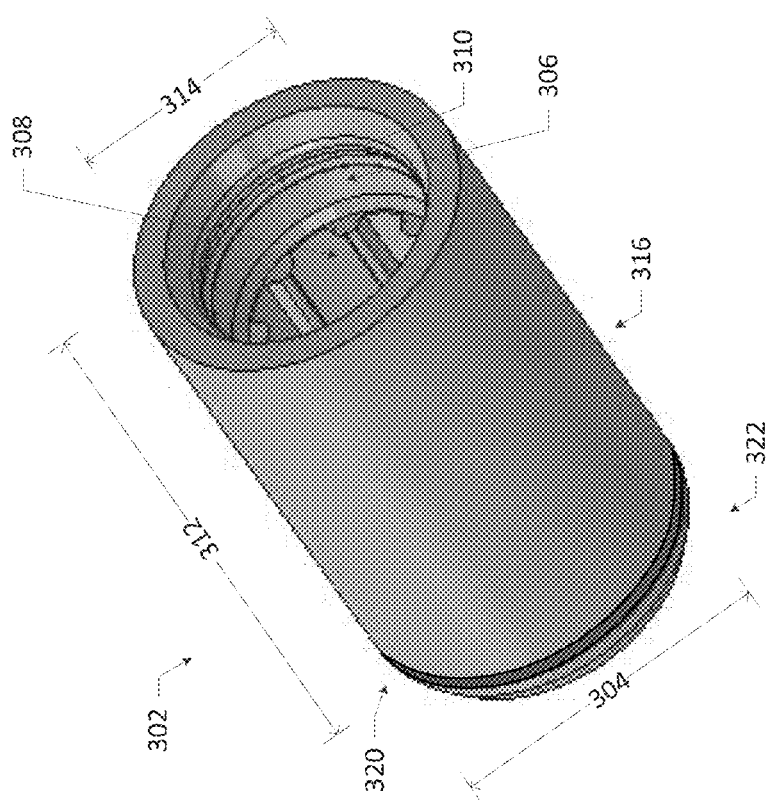
FIG. 3B
FIG. 3A

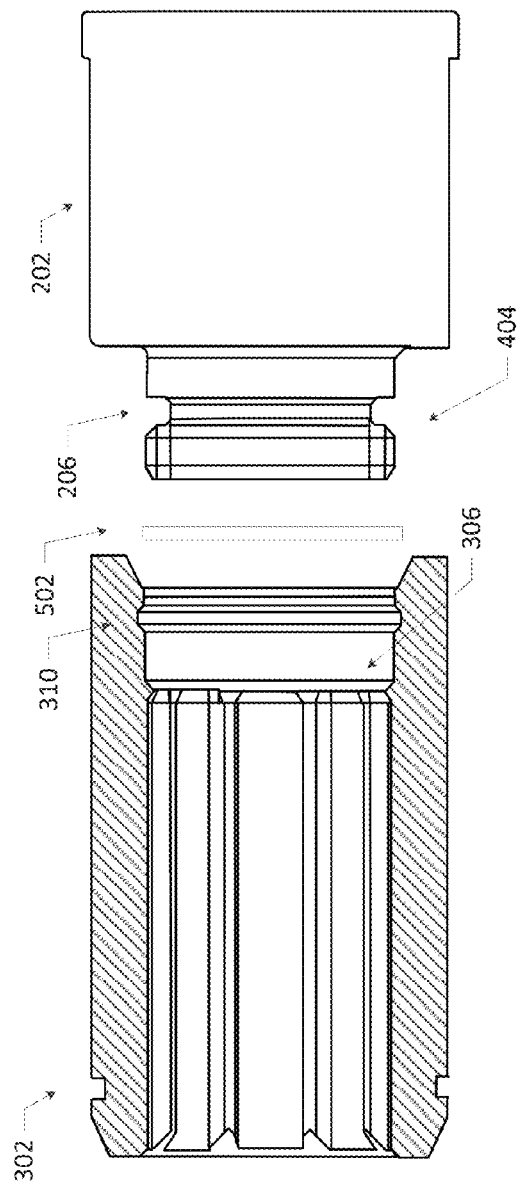
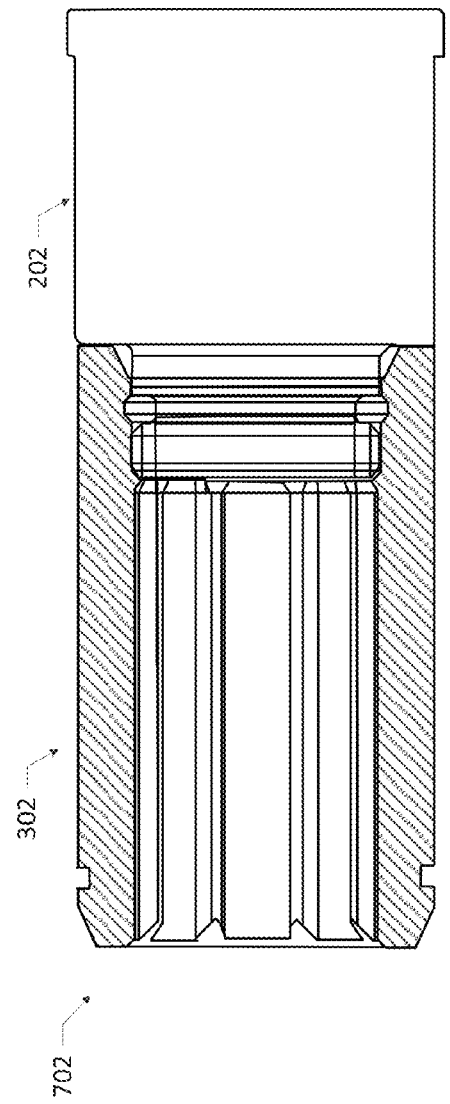

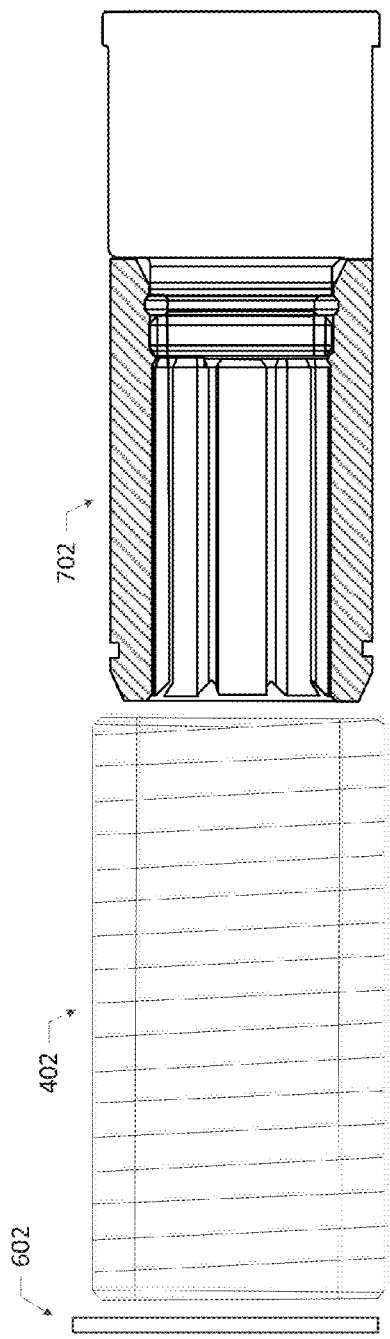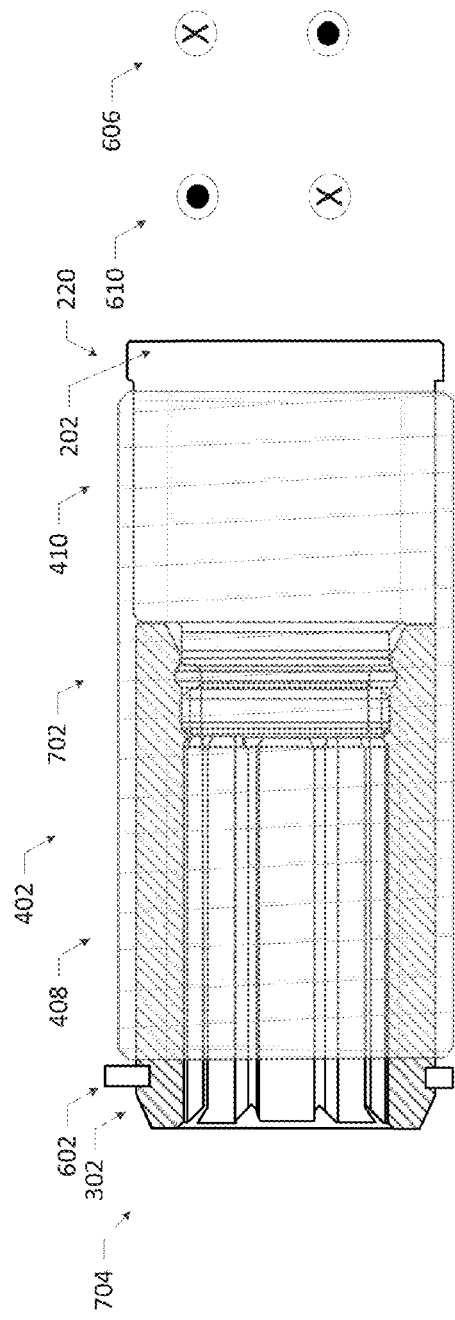

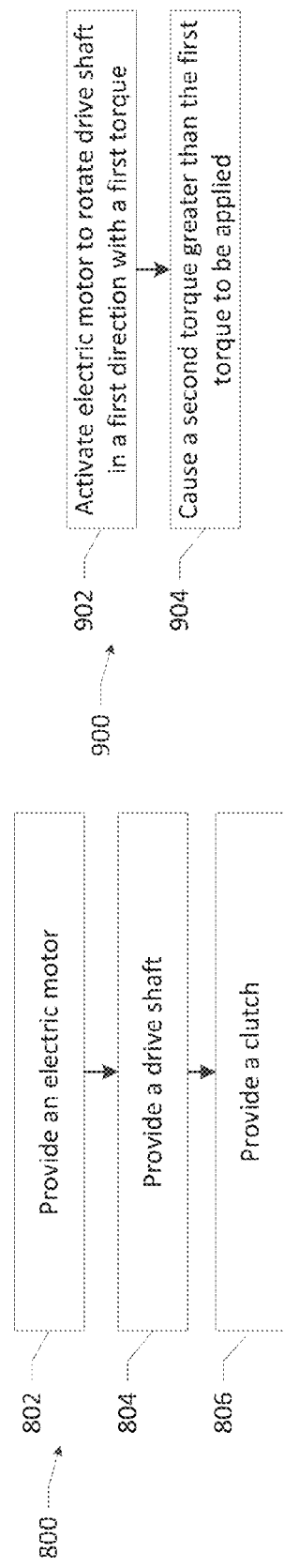

CLUTCH FOR ELECTRIC POLE SAW

TECHNICAL FIELD

The present disclosure relates generally to the field of electric tools, and more particularly, to clutches for electric pole saws.

BACKGROUND

Many existing pole saws are gasoline driven and use centripetal clutches to couple the engine and the elongate shaft to the cutting instrument. Centripetal clutches will decouple the engine and the shaft when the engine speed drops below a threshold, and thus may disengage the shaft and engine when the engine idles. Because electric pole saws do not include an engine that idles, centripetal clutches are not necessary to decouple the shaft from the electric motor. Additionally, existing electric pole saws include non-telescoping flex cable shafts (constructed by twisting many steel wires into a cable configuration) that can withstand the torque applied to the shaft when the electric motor stops during use.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 3A-3B provide various views of a female portion of a clutch, in accordance with various embodiments.

FIGS. 7A-7D depict side views of various stages in the assembly of a clutch, in accordance with various embodiments.

FIG. 8 is a flow diagram of a process for manufacturing an electric pole saw, in accordance with various embodiments.

FIG. 9 is a flow diagram of a process for operating an electric pole saw, in accordance with various embodiments.

DETAILED DESCRIPTION

Figure 1:
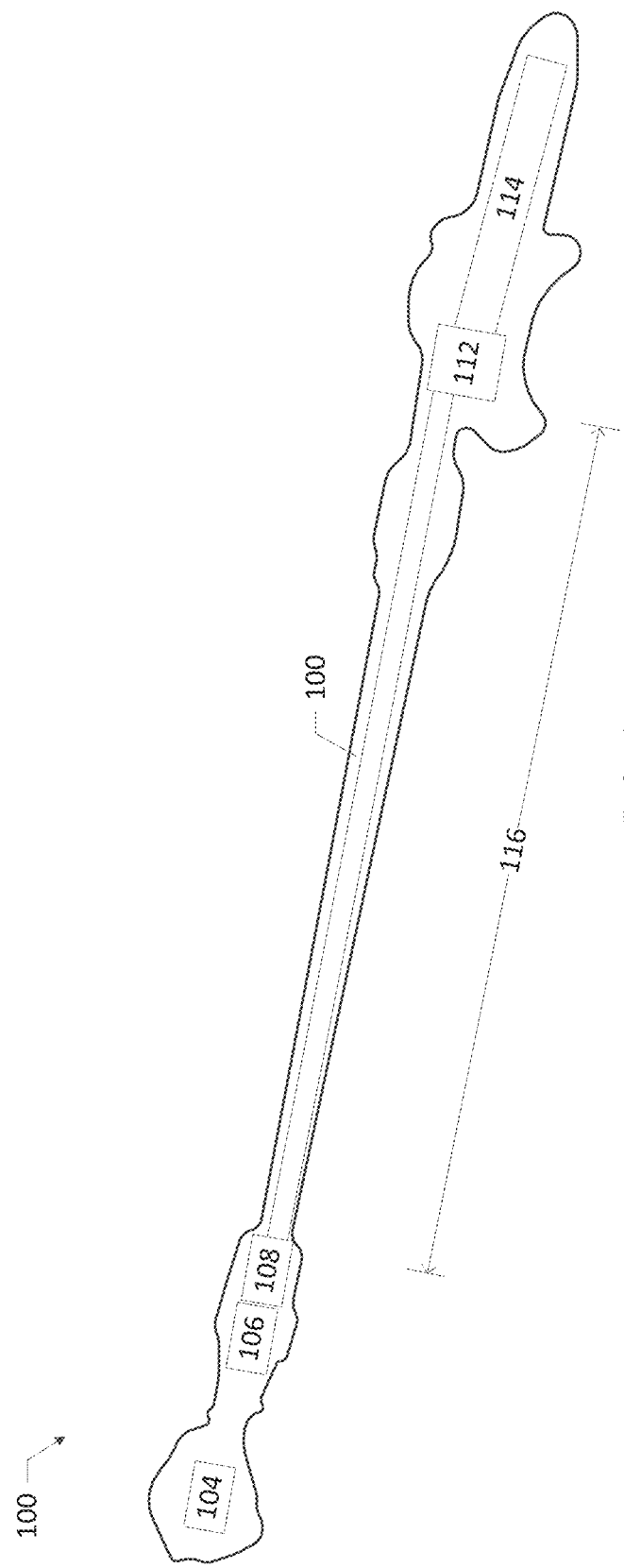
FIG. 1 depicts an electric pole saw having a clutch, in accordance with various embodiments.

Embodiments of clutches for electric pole saws, and related methods, are disclosed herein. In some embodiments, an electric pole saw may include an electric motor, a drive shaft coupled between the electric motor and a cutting instrument, and a clutch coupled between the electric motor and the drive shaft. The clutch may include a motor portion having an exterior surface, a drive shaft portion having an exterior surface and forming a mated assembly when mated with the motor portion, and a spring wound around the exterior surfaces of the motor portion and the drive shaft portion. The spring may exert a friction holding force on the mated assembly, such that rotation of the motor portion in a first direction loosens the spring around the mated assembly and reduces the friction holding force until a torque between the motor portion and the drive shaft portion exceeds the friction holding force, causing rotation of the motor portion to be decoupled from rotation of the drive shaft portion.

The clutches and related techniques disclosed herein may be particularly useful for electric pole saws having telescoping shafts formed of a non-flex cable material, such as an extruded aluminum, having greater rigidity than flex cable shafts. While telescoping shafts are discussed through the present disclosure, non-telescoping shafts may also be used in various embodiments. That said, telescoping shafts may be particularly useful to users (who may adapt the length of the shaft to various cutting applications), and the strength required for such shafts necessitates the use of a material stronger than typical flex cable material.

However, substituting a shaft formed of a non-flex cable material may introduce torque-related challenges not presented by electric pole saws with flex cables. As noted above, a typical flex cable shaft may be made by twisting many steel wires (sometimes in layers) into a cable configuration. If all of the layers of wire are wound in the same direction, the flex cable may have greater torsional stiffness in the direction of the twist (relative to flex cable shafts having layers of wire wound in both directions) and much lower torsional stiffness in the opposite direction. Because of this construction, flex cable shafts may need to "wind up" before they will transmit maximum torque. The "wind up" causes some performance degradation in pole saw applications, but the flexibility of the flex cable shaft means that typical pole saws equipped with a flex cable shaft do not need a centripetal clutch to absorb spikes in torque.

If a telescoping shaft were used to replace a flex cable shaft in an existing electric pole saw, the torque applied to the shaft when the cutting instrument stops during use (while the electric motor continues to run) would twist and warp the shaft, impeding or destroying the telescoping functionality and potentially the usability of the saw. In some embodiments, the torque that may be applied to a shaft in such a situation may be approximately 6.5 times greater than the normal cutting force. Such peak torque values may be greater than the geometry and material yield limits of the telescoping shaft. The clutches and related techniques disclosed herein may enable the use of a telescoping shaft with electric pole saws by reducing the risk of warping the shafts.

In the following detailed description, reference is made to the accompanying drawings which form a part hereof wherein like numerals designate like parts throughout, and in which are shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the disclosed embodiments. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous.

The description may use perspective-based descriptions such as up/down, back/front, and top/bottom. Such descriptions are merely used to facilitate the discussion and are not intended to restrict the application of disclosed embodiments.

The term "coupled," along with its derivatives, may be used. "Coupled" may mean that two or more elements are in direct physical or electrical contact. However, "coupled" may also mean that two or more elements are not in direct contact with each other, but yet still cooperate or interact with each other.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

FIG. 1 depicts an electric pole saw 100, in accordance with various embodiments. Various components of the electric pole saw 100 are described below, but many additional components may be included in an electric pole saw, and various components may be rearranged, duplicated or omitted as desired. The discussion of the electric pole saw 100 below is simply illustrative, and the clutch techniques disclosed herein may be applied to any other suitable electric pole saw configuration.

The electric pole saw 100 may include a handle 102. A battery 104 and an electric motor 106 may be disposed in the handle 102. In some embodiments, one or more of the battery 104 and the electric motor 106 may be disposed outside the handle 102. For example, in some embodiments, electric motor 106 may be disposed outside of, but proximate to, the handle 102. A clutch 108 may be coupled between the electric motor and a drive shaft 110. The clutch 108 may be formed in accordance with any of the techniques disclosed herein (e.g., in accordance with the embodiments discussed below with reference to FIGS. 2-9). The drive shaft 110 may be coupled between the electric motor 106 (e.g., via the clutch 108) and a cutting instrument 114 (e.g., a saw). In some embodiments, a gearbox 112 may be coupled between the drive shaft 110 and the cutting instrument 114.

In some embodiments, the drive shaft 110 may be formed of aluminum. For example, the drive shaft 110 may be formed of extruded aluminum. In other embodiments, the drive shaft 110 may be formed of other metals or other materials having suitable strength. In some embodiments, the drive shaft 110 may be a telescoping drive shaft. In such embodiments, the drive shaft 110 may have a length 116 that is adjustable between a minimum length and a maximum length. In some embodiments, the minimum length may be less than 7 feet and the maximum length may be greater than 8 feet or 10 feet, for example.

The transmission of power between the electric motor 106 and the drive shaft 110 may be regulated by the clutch 108. In some embodiments, the clutch 108 may include a motor portion substantially rigidly coupled to the electric motor 106, a drive shaft portion substantially rigidly coupled to the drive shaft 110, and a spring which may selectively couple the motor portion to the drive shaft portion. In particular, the spring may selectively tighten and loosen around the motor portion and the drive shaft portion depending upon the torque applied to the motor portion to constrain the motor portion and the drive shaft portion to rotate together or to release the motor portion and the drive shaft portion to allow them to rotate separately (e.g., when the torque exceeds a threshold and the spring sufficiently loosens so as to reduce the coupling between the rotation of the motor portion and the drive shaft portion).

In some embodiments, one of the motor portion and the drive shaft portion may be a male portion and the other may be a female portion. For example, the motor portion may be a male portion and the drive shaft portion may be a female portion, or the motor portion may be a female portion and the drive shaft portion may be a male portion. The male and female portions may mate to form a mated assembly, but may be dimensioned so as to rotate with respect to each other unless their rotation is constrained by a spring, as discussed below.

Various embodiments of clutches are now discussed in additional detail with reference to FIGS. 2-9. The clutch as discussed below may be referred to as "the clutch 108," but the clutches disclosed herein may be used in any suitable device (e.g., in addition to or other than the electric pole saw 100).

Figure 2B:
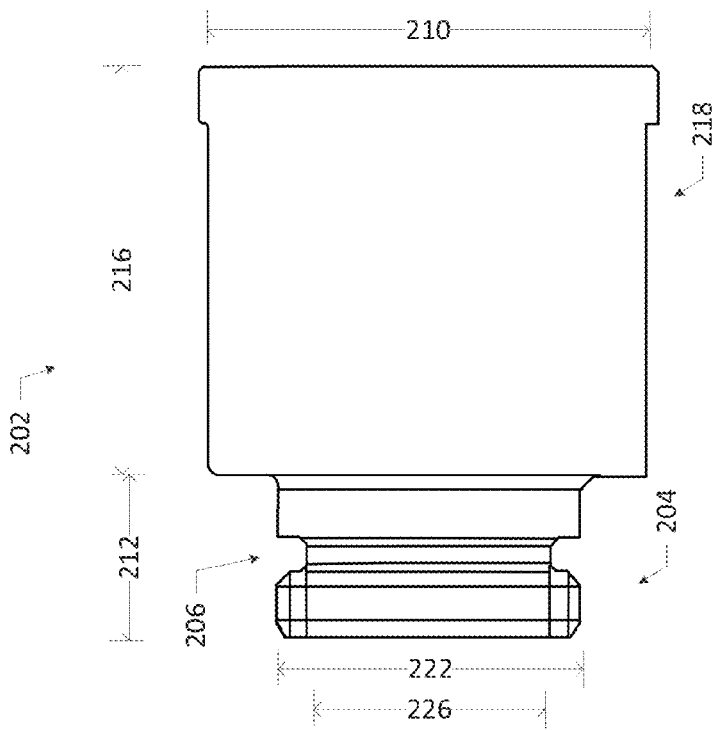
FIGS. 2A-2B provide various views of a male portion of a clutch, in accordance with various embodiments.
Figure 2A:
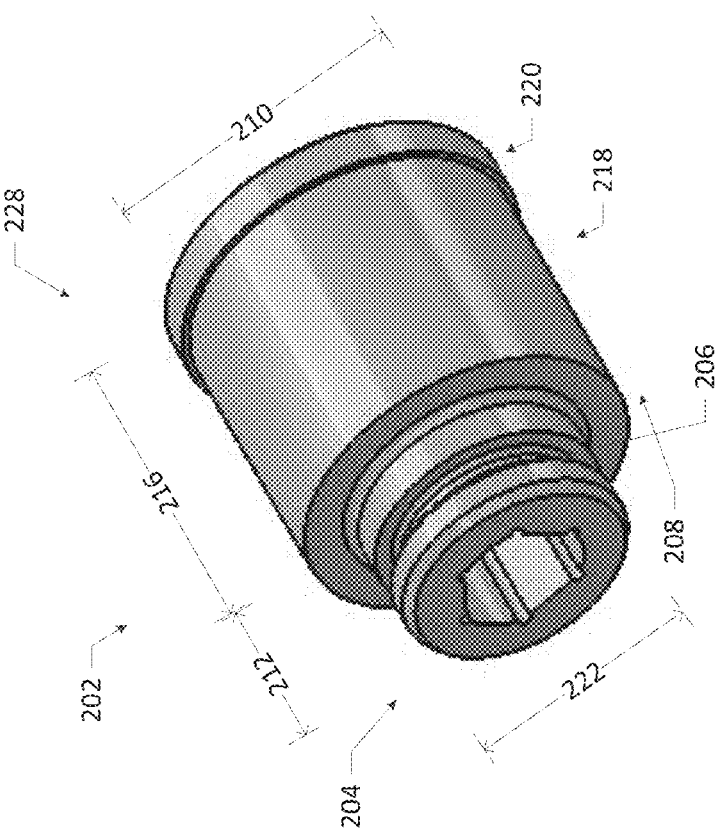

FIGS. 2A-2B provide various views of a male portion 202 of the clutch 108, in accordance with various embodiments. In particular, FIG. 2A provides a perspective view of the male portion 202 and FIG. 2B provides a side cross-sectional view of the male portion 202. The male portion 202 may include a body 218 and a projection 204 extending from the body 218. The body 218 may have an exterior surface 224 and an outer diameter 210, and the projection 204 may have a projection diameter 222. In some embodiments, the outer diameter 210 may be in the approximate range of 15-16 millimeters. In some embodiments, the projection diameter 222 may be in the approximate range of 10-11 millimeters. The body 218 may include a shoulder 220 disposed proximate to the end 228, which may have an outer diameter greater than the outer diameter 210 of the body 218. The body 218 may have a length 216, and the projection 204 may have a length 212. In some embodiments, the length 216 may be in the approximate range of 14-15 millimeters. In some embodiments, the length 212 may be in the approximate range of 5-6 millimeters. In some embodiments, the male portion 202 may have an internal cavity 208 running through the projection 204 and the body 218. The projection 204 may have a snap ring groove 206 with an outer diameter 226. In some embodiments, the outer diameter 226 may be in the approximate range of 8-9 millimeters. The outer diameter 226 of the snap ring groove 206 may be dimensioned so as to receive a snap ring (such as the snap ring 502 discussed below with reference to FIG. 5).

FIGS. 3A-3B provide various views of a female portion 302 of the clutch 108, in accordance with various embodiments. In particular, FIG. 3A provides a perspective view of the female portion 302 and FIG. 3B provides a side cross-sectional view of the female portion 302. The female portion 302 may have an exterior surface 316, a length 312 and an outer diameter 304. In some embodiments, the length 312 may be in the approximate range of 25-26 millimeters. In some embodiments, the outer diameter 304 of the female portion 302 may be the same as the outer diameter 210 of the body 218 of the male portion 202. For example, the outer diameter 304 may be in the approximate range of 15-16 millimeters.

The female portion 302 may have a first interior portion 306 and a second interior portion 308. In some embodiments, the first interior portion 306 may be dimensioned so as to mate with the projection 204 of the male portion 202. In some embodiments, a diameter 314 of the first interior portion 306 may be approximately the same as the diameter 222 of the projection 204 of the male portion 202. For example, the diameter 314 may be in the approximate range of 10-11 millimeters. In some embodiments, the dimensions of the first interior portion 306 and the projection 204 may be selected so that the projection 204 is snugly received in the first interior portion 306 but can rotate within the first interior portion 306 without excessive friction. The first interior portion 306 may include a snap ring groove 310 having a diameter 318. The diameter 318 of the snap ring groove 310 may be dimensioned so as to receive a snap ring (such as the snap ring 502 discussed below with reference to FIG. 5). In particular, when the projection 204 of the male portion 202 is seated within the first interior portion 306 during use, a snap ring may be received in both the snap ring groove 206 of the male portion 202 and the snap ring groove 310 of the female portion 302, thereby keeping the male portion 202 and the female portion 302 together. In some embodiments, the diameter 318 may be in the approximate range of 11-12 millimeters.

The exterior surface 316 of the female portion 302 may have a retaining clip groove 320 disposed proximate to the end 322 of the female portion 302 (opposite to the first interior portion 306). The retaining clip groove 320 may be dimensioned so as to receive a retaining clip (such as the retaining clip 602, discussed below with reference to FIG. 6). In particular, when the female portion 302 is mated with the male portion 202 and a spring (such as the spring 402, discussed below with reference to FIG. 4) is wound around the exterior surface 316 of the female portion 302, the retaining clip may be received in the retaining clip groove 320, thereby keeping the spring retained between the retaining clip and the shoulder 220 of the male portion 202. In some embodiments, the depth of the retaining clip groove 320 may be in the approximate range of 1-2 millimeters. In some embodiments, the width of the retaining clip groove 320 may be in the range of approximately 1-2 millimeters. In some embodiments, the retaining clip groove 320 may be spaced away from the end 322 by a distance in the range of approximately 2-4 millimeters.

Figure 4B:
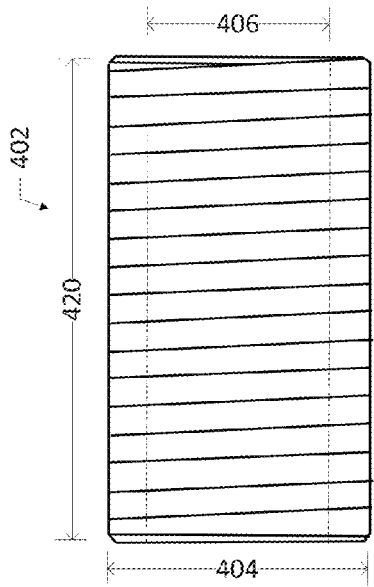
FIGS. 4A-4B provide various views of a spring of a clutch, in accordance with various embodiments.
Figure 4A:
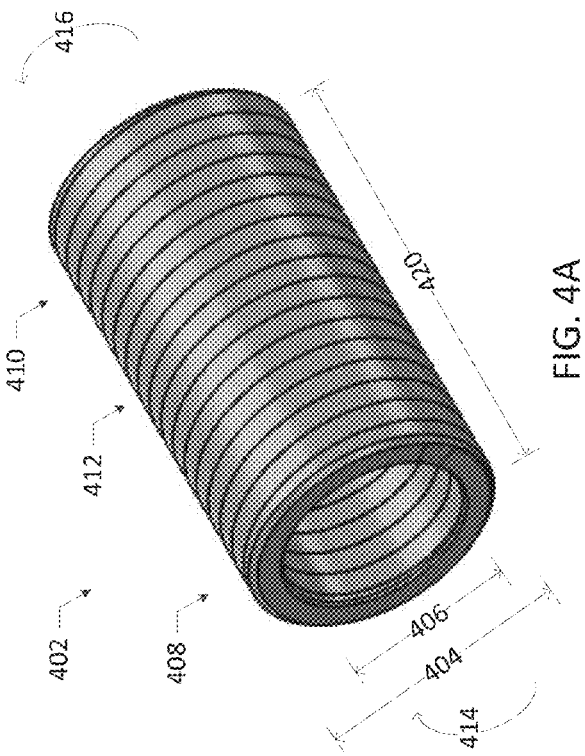

FIGS. 4A-4B provide various views of a spring 402 of the clutch 108, in accordance with various embodiments. In particular, FIG. 4A provides a perspective view of the spring 402 and FIG. 4B provides a side cross-sectional view of the spring 402. The spring 402 may have an outer diameter 404, an inner diameter 406, and a length 420. In some embodiments, the outer diameter 404 may be in the approximate range of 19-20 millimeters, the inner diameter 406 may be in the approximate range of 14-15 millimeters, and the length 420 may be in the approximate range of 36-37 millimeters. In some embodiments, the inner diameter 406 of the spring 402 in its unstretched state may be smaller than the outer diameter 304 of the female portion 302 and the outer diameter 210 of the body 218 of the male portion 202. The spring 402 may be sufficiently flexible to be stretched to be wrapped around the exterior surface 224 of the male portion 202 and the exterior surface 316 of the female portion 302. In some embodiments, the spring 402 may be formed from a spring temper wire, for example.

The spring 402 may have a first end 408 and a second end 410. The coils 412 of the spring 402 may be oriented such that when the first end 408 is rotated in the direction indicated by the arrow 414 and the second end 410 is rotated in the direction indicated by the arrow 416 (e.g., the direction of the coiling), the coils 412 may "loosen," thereby increasing the inner diameter 406. In some embodiments, if the torque applied between the first end 408 and the second end 410 in the direction indicated by the arrows 414 and 416 exceeds a threshold, the inner diameter 406 may increase past a threshold amount, at which point a component previously secured within the spring 402 by friction may be released from the friction fit. If the first end 408 and the second and 410 are rotated in the opposite directions (e.g., the direction opposite to the direction of the coiling), the coils 412 may "tighten," thereby reducing the inner diameter 406.

Figure 5:
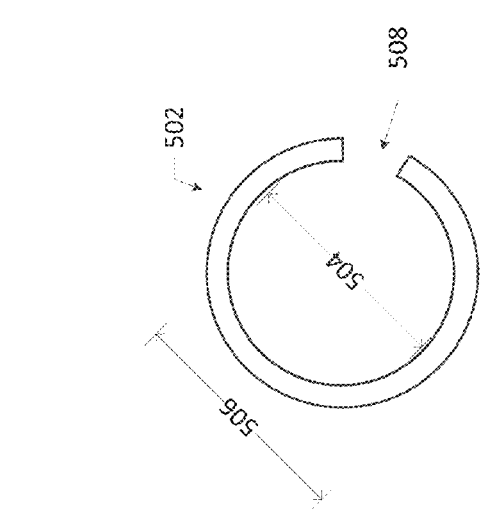
FIG. 5 provides a side cross-sectional view of a snap ring, in accordance with various embodiments.

FIG. 5 provides a side cross-sectional view of a snap ring 502, in accordance with various embodiments. The snap ring 502 may have an inner diameter 504 and an outer diameter 506. In some embodiments, the inner diameter 504 may be approximately equal to the outer diameter 226 of the snap ring groove 206 of the male portion 202. In some embodiments, the outer diameter 506 may be approximately equal to the diameter 318 of the snap ring groove 310 of the female portion 302. For example, in some embodiments, the outer diameter 506 may be in the approximate range of 11-12 millimeters. The inner diameter 504 may be in the approximate range of 8-9 millimeters. The snap ring 502 may include a gap 508, which may be dimensioned so as to allow the snap ring 502 to be deformed as it is received in the snap ring groove 310 of the female portion 302 and the snap ring groove 206 of the male portion 202. In some embodiments, the gap 508 may have a length in the approximate range of 2-3 millimeters, and the snap ring 502 may have a thickness of approximately 1 millimeter. The snap ring 502 may be formed of any of a number of materials, such as music wire.

Figure 6:
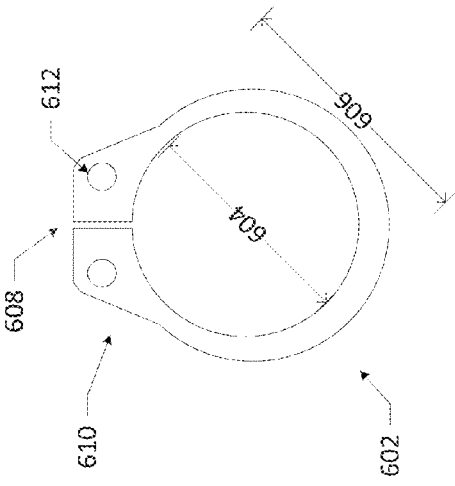
FIG. 6 provides a side cross-sectional view of a retaining clip, in accordance with various embodiments.

FIG. 6 provides a side cross-sectional view of a retaining clip 602, in accordance with various embodiments. The retaining clip 602 may have an inner diameter 604 and an outer diameter 606. In some embodiments, the inner diameter 604 may be approximately equal to the diameter of the retaining clip groove 320 of the female portion 302. For example, in some embodiments, the inner diameter 604 may be in the approximate range of 13-14 millimeters. In some embodiments, the outer diameter 606 may be large enough to "trap" the spring 402 when the spring 402 is wound around the female portion 302. For example, in some embodiments, the outer diameter 606 may be in the approximate range of 16-17 millimeters. The retaining clip 602 may include an extension portion 610 having a gap 608 and one or more apertures 612. The gap 608 may allow the retaining clip 602 to be temporarily "opened" by forces applied to the extension portion 610 so that the retaining clip 602 may be disposed in the retaining clip groove 320. In some embodiments, the apertures 612 may have diameters in the approximate range of 1-2 millimeters. The retaining clip 602 may have any suitable thickness, such as a thickness of approximately 1 millimeter. The snap ring 502 may be formed of any of a number of materials, such as spring steel.

FIGS. 7A-7D depict side views of various stages in the assembly of the clutch 108, in accordance with various embodiments. In FIG. 7A, the female portion 302, the male portion 202 and the snap ring 502 are illustrated. As discussed above, the female portion 302 may have a snap ring groove 310 (dimensioned to receive the snap ring 502) and a first interior portion 306 (dimensioned to receive the projection 204 of the male portion 202). The male portion 202 may have a snap ring groove 206 (dimensioned to receive the snap ring 502).

In FIG. 7B, the female portion 302, the male portion 202 and the snap ring 502 are illustrated as mated into a mated assembly 702. In the mated assembly 702, the male portion 202 may rotate with respect to the female portion 302. In particular, the male portion 202 may not be rotationally coupled with the female portion 302 so that the male portion 202 and the female portion 302 may be permitted to rotate substantially independently of each other.

In FIG. 7C, the mated assembly 702 is illustrated along with the spring 402 and the retaining clip 602. In FIG. 7D, a clutch 704 is illustrated having the spring 402 wound around the exterior surfaces 316 and 224 of the female portion 302 and the male portion 202, respectively. The retaining clip 602 and the shoulder 220 of the male portion 202 may prevent the spring 402 from sliding off the mated assembly 702.

The winding of the spring 402 around the mated assembly 702 may be tight enough to rotationally couple the female portion 302 and the male portion 202. For example, if the male portion 202 or the female portion 302 is not rotationally constrained, rotating the unconstrained portion may also rotate the other portion due to the friction holding force on the mated assembly exerted by the spring 402. In some embodiments, the spring 402 may exert a friction holding force on the mated assembly, such that rotation of the motor portion in a first direction loosens the spring around the mated assembly and reduces the friction holding force until a torque between the motor portion and the drive shaft portion exceeds the friction holding force, causing rotation of the motor portion to be decoupled from rotation of the drive shaft portion If the male portion 202 were to rotate in the direction indicated by the indicators 706 (e.g., the direction of the coiling) with respect to the female portion 302, the spring 402 may tighten further on the exterior surfaces 316 and 224. This may increase the strength of rotational coupling between the male portion 202 and the female portion 302, exerting greater friction holding forces on the male portion 202 and the female portion 302 so as to urge the male portion 202 and the female portion 302 to rotate together. In some embodiments, the male portion 202 and the female portion 302 may be constrained so as to not generally allow rotation in the direction indicated by the indicator 706 (e.g., when the clutches disclosed herein are used as torque-limiting devices, as discussed below).

If the male portion 202 rotates in the direction indicated by the indicators 710 (e.g., the direction opposite to the direction of the coiling) with respect to the female portion 302, the spring 402 may loosen on the exterior surfaces 316 and 224. If the torque between the female portion 302 and the male portion 202 exceeds the friction holding force exerted by the spring 402, the friction holding force may no longer be sufficient to couple the rotation of the female portion 302 and the male portion 202, causing rotational decoupling between the male portion 202 and the female portion 302. After such decoupling, so that the male portion 202 may rotate more independently of the female portion 302 than prior to the decoupling.

Thus, if the male portion 202 is coupled to the electric motor 106 (e.g., as the motor portion discussed above), and the electric motor 106 causes the male portion 202 to rotate in the direction indicated by the indicators 706, the spring 402 may tighten on the mated assembly 702 and may rotationally couple the male portion 202 and the female portion 302. If the female portion 302 is coupled to the drive shaft 110 (e.g., as the drive shaft portion discussed above), the rotation of the female portion 302 may translate to rotation of the drive shaft 110. If the drive shaft 110 were to cause the female portion 302 to stop rotating suddenly (e.g., if the operation of the cutting instrument 114 coupled to the drive shaft 110 were stopped), and the electric motor 106 was still rotating, the spring 402 would loosen, rotationally decoupling the male portion 202 from the female portion 302 and thereby rotationally decoupling the electric motor 106 from the drive shaft 110. This decoupling may allow the electric motor 106 to reach its current limit and then shut down without being rotationally coupled to the drive shaft 110, rather than imposing the excessive torque on the drive shaft 110 that may result from the drive shaft 110 stopping rotation at one end while the other end of the drive shaft 110 continues to be driven by the electric motor 106.

In some embodiments, the motor portion (e.g., the male portion 202 or the female portion 302, in various embodiments) may be configured to rotate only in the direction that "loosens" the spring 402. When the torque applied by the motor portion exceeds the friction holding force of the spring 402, the spring 402 may loosen so as to decouple the motor portion and the drive shaft portion (e.g., the other of the male portion 202 or the female portion 302). In such embodiments, the clutch may act as a torque-limiting device. The threshold torque of the torque-limiting device may be a function of the geometry of the spring 402, the male portion 202, and the female portion 302 and the material properties of the spring 402 and other elements that determine the friction holding force of the spring 402 on the male portion 202 and the female portion 302. These geometries and properties may be selected to achieve a desired threshold torque for the torque-limiting device.

Any of a number of materials may be used for the clutch elements discussed herein (e.g., the male portion 202 and the female portion 302), such as any of the materials discussed above. For example, the male portion 202 and the female portion 302 may be formed from any material with hardness and wear properties suitable for dealing with the compressive and sliding forces applied by the spring 402, such as powdered metal and/or other hardened steels.

In some embodiments, instead of the shoulder 220, the snap ring 502 and/or the retaining clip 602, other mechanisms may be used to secure the spring 402, the male portion 202, and the female portion 302. For example, after the male portion 202 and the female portion 302 are mated and the spring 402 is wound around the exterior surfaces, a washer having a diameter larger than the outer diameter 222 may be disposed proximate to the end 228 of the male portion 202 and a washer having a diameter larger than the outer diameter 304 may be disposed proximate to the end 322 of the female portion. A cylinder having a diameter approximately equal to the washer diameters may be secured to the washers and may contain the male portion 202, the female portion 302 and the spring 402 inside, while allowing the male portion 202, the female portion 302 and the spring 402 to rotate.

FIG. 8 is a flow diagram of a process 800 for manufacturing an electric pole saw (e.g., the electric pole saw 100), in accordance with various embodiments. It may be recognized that, while the operations of the process 800 (and all other processes disclosed herein) may be arranged in a particular order and illustrated once each, in various embodiments, one or more of the operations may be repeated, omitted or performed out of order. Any of the operations of the process 800 may be performed in accordance with any of the clutch embodiments described herein.

At the operation 802, an electric motor may be provided. The electric motor of the operation 802 may take the form of any of the embodiments of the electric motor 106 discussed herein, or any other suitable forms.

At the operation 804, a drive shaft may be provided. The drive shaft may be coupled between the electric motor and a cutting instrument. The drive shaft of the operation 804 may take the form of any of the embodiments of the drive shaft 110 discussed herein, or any other suitable forms. For example, in some embodiments, the drive shaft may be a telescoping drive shaft.

At the operation 806, a clutch may be provided. The clutch may be coupled between the electric motor (operation 802) and the drive shaft (operation 804). The clutch of the operation 806 may take the form of any of the embodiments of the clutch 108 discussed herein, or any other suitable forms. In some embodiments, the clutch may include a motor portion (e.g., one of the male portion 202 and the female portion 302), a drive shaft portion (e.g., the other of the male portion 202 and the female portion 302) and a spring (e.g., the spring 402). The spring may be wound around the exterior surfaces of the motor portion and the drive shaft portion (forming a mated assembly) and may exert a friction holding force on the mated assembly. The friction holding force may be such that rotation of the motor portion in a first direction loosens the spring around the mated assembly and reduces the friction holding force until a torque between the motor portion and the drive shaft portion exceeds the friction holding force, causing rotation of the motor portion to be decoupled from rotation of the drive shaft portion. In some embodiments, the spring may have a first diameter when the spring is wound around the exterior surfaces of the motor portion and the drive shaft portion and a second smaller diameter when the spring is removed from the exterior surfaces of the motor portion of the drive shaft portion.

FIG. 9 is a flow diagram of a process 900 for operating an electric pole saw (e.g., the electric pole saw 100), in accordance with various embodiments.

At the operation 902, an electric motor of the electric pole saw may be activated to rotate a drive shaft in a first direction. The electric motor, electric pole saw and drive shaft may take the form of any of the embodiments of these elements discussed herein, or any other suitable forms (e.g., any of the forms discussed above with reference to FIG. 1). For example, in some embodiments, activating the electric motor of the electric pole saw may include pressing an actuator on a handle of the electric pole saw. The drive shaft may be coupled between the electric motor and a cutting instrument to operate the cutting instrument, and a clutch may be coupled between the electric motor and the drive shaft. The clutch may include a motor portion coupled to the electric motor and a drive shaft portion coupled to the drive shaft. The clutch may also include a spring wound around the exterior surfaces of the motor portion in the drive shaft portion. Rotation of the motor portion in the first direction with a first torque may cause rotation of the drive shaft in the first direction. In some embodiments, the first torque may be less than a friction holding force of the spring on the motor portion and the drive shaft portion.

At the operation 904, the torque of the motor portion may be increased to a second torque greater than the first torque. This may occur when, for example, the electric pole saw 100 is operating and is thrust down onto a log or other material that resists movement of the cutting instrument 114. In response, the spring of the clutch of the operation 902 may loosen around the mated assembly to decouple rotation of the motor portion and the drive shaft portion. For example, the second torque may be greater than the friction holding force of the spring on the motor portion and the drive shaft portion. In some embodiments, this may cause the electric motor current to "limit out" and thereby turn off. In some embodiments, the electric motor may turn off after 0.2 seconds or less. Damage to the drive shaft may thus be limited or avoided.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein.

What is claimed is:

1. An electric pole saw, comprising:
an electric motor;
a drive shaft coupled between the electric motor and a cutting instrument; and
a clutch coupled between the electric motor and the drive shaft, wherein the clutch comprises:
a motor portion having an exterior surface,
a drive shaft portion having an exterior surface and forming a mated assembly when mated with the motor portion, and
a spring wound around the exterior surfaces of the motor portion and the drive shaft portion and exerting a friction holding force on the mated assembly, such that rotation of the motor portion in a first direction loosens the spring around the mated assembly and reduces the friction holding force until a torque between the motor portion and the drive shaft portion exceeds the friction holding force, causing rotation of the motor portion to be decoupled from rotation of the drive shaft portion.

2. The electric pole saw of claim 1, wherein the electric motor is disposed in a handle of the electric pole saw.

3. The electric pole saw of claim 1, wherein the drive shaft is formed of aluminum.

4. The electric pole saw of claim 3, wherein the drive shaft is formed of extruded aluminum.

5. The electric pole saw of claim 1, wherein the drive shaft is a telescoping drive shaft.

6. The electric pole saw of claim 5, wherein the drive shaft telescopes to a length of greater than 8 feet.

7. The electric pole saw of claim 1, wherein one of the motor portion and the drive shaft portion is a male portion having a projection and the other of the motor portion and the drive shaft portion is a female portion having a cavity dimensioned to receive the projection.

8. The electric pole saw of claim 7, further comprising a snap ring disposed between the projection of the male portion and an interior wall of the cavity of the female portion.

9. The electric pole saw of claim 1, wherein the spring has a first diameter when the spring is wound around the exterior surfaces of the motor portion and the drive shaft portion and a second diameter when the spring is removed from the exterior surfaces of the motor portion and the drive shaft portion, the first diameter larger than the second diameter.

10. A method of manufacturing an electric pole saw, comprising:
providing an electric motor;
providing a drive shaft coupled between the electric motor and a cutting instrument; and
providing a clutch coupled between the electric motor and the drive shaft, wherein the clutch comprises:
a motor portion having an exterior surface,
a drive shaft portion having an exterior surface and forming a mated assembly when mated with the motor portion, and
a spring wound around the exterior surfaces of the motor portion and the drive shaft portion and exerting a friction holding force on the mated assembly, such that rotation of the motor portion in a first direction loosens the spring around the mated assembly and reduces the friction holding force until a torque between the motor portion and the drive shaft portion exceeds the friction holding force, causing rotation of the motor portion to be decoupled from rotation of the drive shaft portion.

11. The method of claim 10, wherein the drive shaft is a telescoping drive shaft.

12. The method of claim 10, wherein the spring has a first diameter when the spring is wound around the exterior surfaces of the motor portion and the drive shaft portion and a second diameter when the spring is removed from the exterior surfaces of the motor portion and the drive shaft portion, the first diameter larger than the second diameter.

13. A method of operating an electric pole saw, comprising:
activating an electric motor of the electric pole saw to rotate a drive shaft in a first direction with a first torque, wherein the drive shaft is coupled between the electric motor and a cutting instrument to cause the operation of the cutting instrument and a clutch is coupled between the electric motor and the drive shaft, and wherein the clutch comprises:
   a motor portion coupled with the electric motor and having an exterior surface,
   a drive shaft portion coupled with the drive shaft, having an exterior surface, and forming a mated assembly when mated with the motor portion, and
   a spring wound around the exterior surfaces of the motor portion and the drive shaft portion, such that rotation of the motor portion in the first direction with the first torque causes rotation of the drive shaft in the first direction;
cause a second torque greater than the first torque to be applied, thereby loosening the spring around the mated assembly to decouple rotation of the motor portion and the drive shaft portion.

14. The method of claim 13, wherein the drive shaft is a telescoping drive shaft.

15. The method of claim 13, wherein the drive shaft telescopes to a length of greater than 8 feet.

16. The method of claim 13, wherein activating the electric motor of the electric pole saw comprises pressing an actuator on a handle of the electric pole saw.

17. The method of claim 13, wherein the first torque is less than a friction holding force of the spring on the motor portion and the drive shaft portion and the second torque is greater than the friction holding force of the spring on the motor portion and the drive shaft portion.

\* \* \* \* \*